United States Patent [19]
Niimi

[11] Patent Number: 5,949,169
[45] Date of Patent: Sep. 7, 1999

[54] ELECTRIC ROTATING MACHINE HAVING RADIALLY OUTWARDLY EXTENDING BULGE ON YOKE

[75] Inventor: Masami Niimi, Handa, Japan

[73] Assignee: Denso Corporation, Kariya, Japan

[21] Appl. No.: 09/123,439

[22] Filed: Jul. 28, 1998

[30] Foreign Application Priority Data

Jul. 31, 1997 [JP] Japan .................................. 9-205540

[51] Int. Cl.⁶ .................................................. H02K 1/06
[52] U.S. Cl. ............................ 310/154; 310/89; 310/254
[58] Field of Search ............................ 310/89, 154, 254, 310/258, 259

[56] References Cited

U.S. PATENT DOCUMENTS

| | | | |
|---|---|---|---|
| 3,594,599 | 7/1971 | Godfrey | 310/258 |
| 5,475,276 | 12/1995 | Shiga et al. | 310/154 |
| 5,723,929 | 3/1998 | Nimi | 310/154 |
| 5,777,393 | 7/1998 | Katoh et al. | 290/48 |

Primary Examiner—Nestor Ramirez
Assistant Examiner—Burton S. Mullins
Attorney, Agent, or Firm—Pillsbury Madison & Sutro LLP

[57] ABSTRACT

A plurality of magnetic poles each made of a permanent magnet is circumferentially arranged at regular intervals on the inner circumferential surface of a yoke. Bulged portions are axially formed on a wall portion of the yoke between the adjacent two magnetic poles. The bulged portions extend in a direction from the inner circumferential side of the yoke toward the outer circumferential side thereof. Each bulged portion is semicircular in section and connected with a cylindrical wall portion of the yoke through a radius. An angle between a side surface of each magnetic pole and the inner circumferential surface of each bulged portion is larger than an angle between the side surface of each magnetic pole and an inner circumferential surface of the cylindrical wall portion of the yoke. An open end of the yoke is closed with an end cover fixed to the yoke with a plurality of through-bolts by tightening. Each of the through-bolts is installed in the yoke through the inner side of each of the bulged portions of the yoke.

7 Claims, 6 Drawing Sheets

MAGNETOMOTIVE
FORCE OF ARMATURE

ELECTRIC ROTATING MACHINE HAVING RADIALLY OUTWARDLY EXTENDING BULGE ON YOKE

CROSS REFERENCE TO RELATED APPLICATION

This application relates to and incorporates herein by reference Japanese Patent Application No. 9-205540 filed on Jul. 31, 1997.

BACKGROUND OF THE INVENTION

1. Field of the Invention

The present invention relates to an electric rotating machine having a stator in which a plurality of magnetic poles comprising permanent magnets are arranged on the inner circumferential surface of a yoke. The present invention may be used for a starter for an engine.

2. Description of Related Art

Conventionally, in a stator using permanent magnets as magnetic poles, the thickness of a yoke made of a steel plate is made thinner than that of a yoke of a stator of coil winding type. Thus, this stator using permanent magnets is preferable for manufacturing an electric rotating machine in compact size and in light weight. However, when a thin yoke is used for a starter which is used under high vibration conditions, the yoke may resonate with vibrations transmitted from external parts such as an engine because the rigidity of the yoke is low. In this case, through-bolts which are tightening members loosen. As a result, abnormal wear or the like may be caused in component parts.

In U.S. Pat. No. 5,475,276 which corresponds to Japanese Laid-Open Patent Publication No. 8-163798, there is proposed an electric rotating machine in which, as shown in FIG. 4, between magnetic poles (permanent magnets) arranged circumferentially adjacent to each other, radially inwardly extending concaves 6 are formed on the cylindrical wall portion of a yoke 2 from the outer circumferential side thereof to the inner circumferential side thereof, and through-bolts 4 are installed in the concaves 6. In this case, because the concaves 6 perform the action of a rib, the tightening force of the through-bolts 4 can be received by the end surfaces of the concaves 6. Thus, a sufficient rigidity can be securely provided even though the thickness of the yoke 2 is reduced.

However, when the concaves 6 are formed on the cylindrical wall portion of the yoke 2, each of the concaves 6 is interposed between the magnetic poles which are adjacent to each other circumferentially. Thus, the distance between the side surface of each of the magnetic poles and the yoke 2 (concave 6) is shorter than the distance between the side surface of each of the magnetic poles and the yoke 2 having no concaves formed on the cylindrical wall portion thereof. As a result, the magnetic leakage between the side surface of each of the magnetic poles and the yoke 2 (concave 6) increases and thus the performance of the electric rotating machine is lessened.

SUMMARY OF THE INVENTION

It is an object of the present invention to provide an electric rotating machine in which magnetic poles comprising permanent magnets are arranged on the inner circumferential surface of a yoke to reduce magnetic leakage from the side surface of each of the magnetic poles to the yoke and which is superior in rigidity.

According to the present invention, bulged portions are formed axially on a yoke between magnetic poles circumferentially adjacent to each other. Each bulged portion extends from a starting point located proximately to an intersection of the inner circumferential surface of the yoke and a side surface of each of the magnetic poles in a direction from an inner circumferential side of the yoke toward an outer circumferential side thereof.

Preferably, an angle formed between the side surface of each of the magnetic poles and the inner circumferential surface of each of the bulged portions extending from the starting point toward the outer circumferential side of the yoke is greater than an angle formed between the side surface of each of the magnetic poles and a tangent crossing on the inner circumferential surface of the yoke at the intersection point of the side surface of each of the magnetic poles and the inner circumferential surface of the yoke. This construction lengthen the distance between the side surface of each magnetic pole and the bulged portion, thus reducing magnetic flux leakage from the side surface of the magnetic pole to the yoke.

Preferably, an auxiliary magnetic pole is installed between the adjacent two magnetic poles to improve the demagnetizing performance of the auxiliary magnetic pole. Because the auxiliary magnetic pole is installed at the inner circumferential side of the bulged portion, the distance between the inner circumferential surface of the bulged portion and the auxiliary magnetic pole can be allowed to be longer than the distance therebetween in the yoke having no bulged portions. This construction increases the magnetic resistance of a magnetic circuit including the auxiliary magnetic pole and improves the demagnetizing performance of the auxiliary magnetic pole.

Preferably, a through-bolt is inserted into the bulged portion such that it is positioned in proximity to the inner circumferential surface thereof. It is possible to make the area of the seat surface of the yoke which receives the tightening force of the through-bolt greater to withstand a higher bolt-tightening force. This construction eliminates the need for increasing the rigidity of the closing member for closing the open end of the yoke.

BRIEF DESCRIPTION OF THE DRAWINGS

Other objects, features and advantages of the present invention will become more apparent from the following detailed description made with reference to the accompanying drawings.

DETAILED DESCRIPTION OF THE PREFERRED EMBODIMENT

Figure 1:
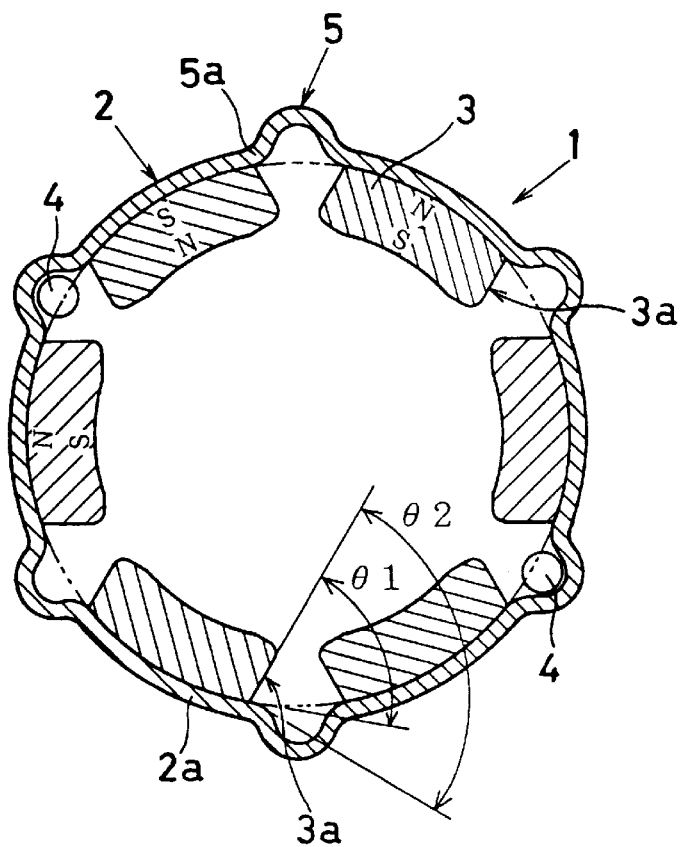
FIG. 1 is a sectional view showing a stator in a radial direction thereof according to a first embodiment of the present invention.

An electric rotating machine according to the present invention will be described below with reference to various embodiments shown in the drawings.

First Embodiment

In a first embodiment shown in FIG. 1, an electric rotating machine is a DC motor for use in, for example, a starter for a vehicle and has a stator 1 (magnetic field device) having a plurality of magnetic poles 3 provided on the inner circumferential surface of a yoke 2.

The yoke 2 is made of a soft steel plate which is a magnetic material and is formed in an approximately cylindrical shape. An open end of the yoke 2 positioned at at least one end thereof in the axial direction thereof is closed with an end cover (closing member) not shown in the figure. The end cover is fixed to the yoke 2 with a plurality of through-bolts 4 by tightening.

The magnetic poles 3 each comprising a permanent magnet such as ferrite, formed in the shape of an approximately rectangular solid are arranged at regular intervals in the circumferential direction of the yoke 2. The magnetic poles 3 are magnetized such that south poles and north poles appear radially. The magnetic poles 3 arranged circumferentially adjacent to each other are magnetized such that they are different from each other, that is, such that respective magnetic poles 3 are south poles and north poles alternately with each other in the circumferential direction.

Between the magnetic poles 3 arranged circumferentially adjacent to each other, bulged portions 5 are formed to extend axially on the yoke 2 from a starting point located proximately to the intersection of the inner circumferential surface of the yoke 2 and a side surface of each of the magnetic poles 3 in a direction from the inner circumferential side of the yoke 2 toward the outer circumferential side thereof. As shown in FIG. 1, each of the bulged portions 5 extends radially outwardly in a semicircular shape in section and is connected with a cylindrical wall portion 2a of the yoke 2 through a radius 5a. An angle θ2 formed between the side surface 3a of each magnetic pole 3 and the inner circumferential surface of each bulged portion 5 is constructed to establish the following relationship (equation 1) with an angle θ1 formed between the side surface 3a of each magnetic pole 3 and the inner circumferential surface of the cylindrical wall portion 2a of the yoke 2:

$$\theta2 > \theta1 \qquad \text{<Equation 1>}$$

As shown in FIG. 1, each through-bolt 4 is positioned in proximity to the inner circumference of each bulged portion 5.

Figure 2:
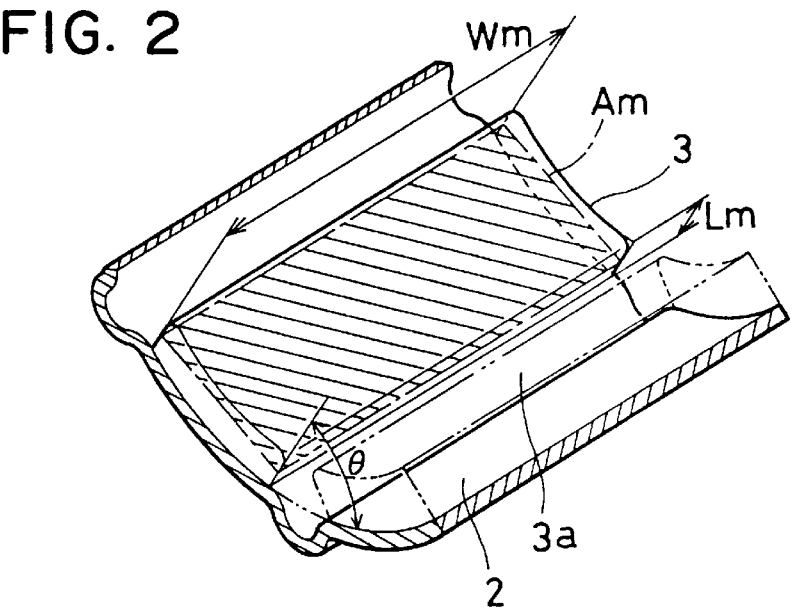
FIG. 2 is a perspective view showing a permanent magnet used in the first embodiment.

When the permanent magnet is used as the magnetic pole 3 of the stator 1, as in the case of the embodiment, magnetic leakage from the side surface 3a of each magnetic pole 3 affects the performance of the electric rotating machine because the magnetic permeability of a ferrite magnet which is in wide use and that of air is almost equal to each other. The magnetic leakage is expressed by leakage permeance coefficient Pe determined by the following equation (equation 2):

$$Pe=(180/\pi\cdot\theta)\times(Lm/Am)\times Wm \qquad \text{<Equation 2>}$$

where Lm: thickness of magnet (magnetic pole 3) in the radial direction thereof, Am: sectional area of magnet (magnetic pole 3), Wm: width of magnet (magnetic pole 3) in the axial direction thereof, θ: angle which is formed between the side surface of magnet (side surface 3a of magnetic pole 3) and inner circumferential surface of yoke 2 (FIG. 2).

The effective magnetic flux amount φm of the magnetic pole 3 is determined by the following equation (equation 3):

$$\phi m=(Bd-2Pe\cdot Hd)\times Am \qquad \text{<Equation 3>}$$

From this relationship, it is effective to set θ to a possible greatest value to reduce the magnetic leakage expressed by the leakage permeance coefficient Pe. As a result, the effective magnetic flux amount φm increases and the output of the electric rotating machine can be improved.

According to the first embodiment, because the bulged portion 5 bulging from the inner circumferential side of the yoke 2 toward the outer circumferential side thereof are formed between the magnetic poles 3 of the yoke 2, the angle θ2 formed between the side surface 3a of each magnetic pole 3 and the inner circumferential surface of each bulged portion 5 can be set to be greater than the angle θ1 formed between the side surface 3a of each magnetic pole 3 and the inner circumferential surface of the cylindrical wall portion 2a of the yoke 2. Thus, as understood from the above relationships (equations 2 and 3), magnetic leakage from the side surface 3a of each magnetic pole 3 can be reduced. Consequently, the effective magnetic flux amount φm increases and the output of the electric rotating machine can be improved.

Further, because the through-bolt 4 is inserted into each bulged portion 5 such that it is positioned in proximity to the inner circumferential surface of each bulged portion 5, the distance between the through-bolt 4 and the side surface 3a of each magnetic pole 3 can be set to be greater than that in a stator having no bulged portion 5 formed thereon. The through-bolts 4 are installed between the magnetic poles 3 arranged circumferentially adjacent to each other. Consequently, the construction has an effect of reducing the magnetic leakage between the magnetic poles 3 adjacent to each other. A greater effect can be obtained when many through-bolts 4 (three or more) are used (in correspondence to the maximum number of magnetic poles) to enhance the vibration-resistant property of the electric rotating machine.

Figure 3:
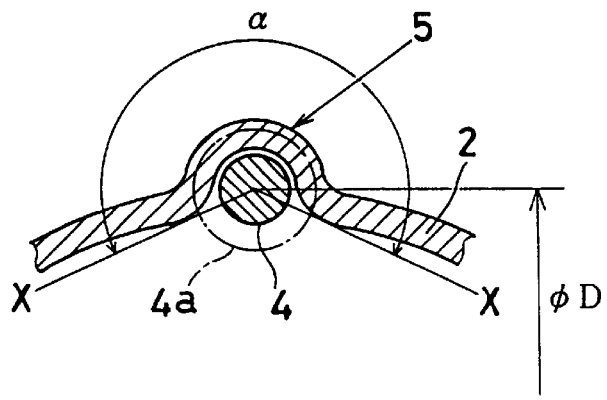
FIG. 3 is a sectional view showing partly a bulged portion of a yoke used in the first embodiment.
Figure 4:
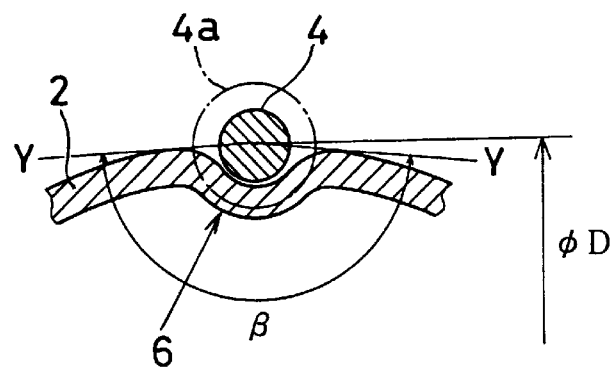
FIG. 4 is a sectional view showing partly a concave of a yoke used in a conventional stator.

Furthermore, in the embodiment, it is possible to improve the bolt-seating performance of the end surface (seat surface) of the yoke 2 which receives the tightening force of the through-bolts 4. That is, as shown in FIG. 3, in the case where two tangents X which cross the inner circumferential surface of the yoke 2 are drawn from the center O of the through-bolt 4, the angle a formed between the two tangents X and including the bulged portion 5 is greater than 180°. On the other hand, in the case where the concave 6 is formed between the magnetic poles 3 of the yoke 2, as shown in FIG. 4, when two tangents Y which crosses the outer circumferential surface of the yoke 2 are drawn from the center O of the through-bolt 4, the angle β formed between two tangents Y and including the concave 6 is smaller than 180°. It is to be noted that a circle 4a shown in FIGS. 3 and 4 by one-dot chain line is an imaginary line indicating the diameter of the head of the through-bolt 4 and that φD shown in FIGS. 3 and 4 is the diameter of a circle formed by connecting the through-bolts 4 radially opposed to each other.

As described above, because it is possible to make the area of the seat surface which receives the tightening force of the through-bolt 4 greater than the area of the conventional construction, the seat surface of the yoke 2 has an improved bolt-seating performance and the seat surface is not inclined even though the through-bolt 4 is tightened with a great force. Thus, the through-bolts 4 can be tightened with a greater force. Accordingly, it is unnecessary to increase the rigidity of the end cover which closes the open end of the yoke 2, which allows the end cover to be made of other materials, for example, resin instead of metal such as a steel plate or aluminum die cast which is hitherto used and thus allows the electric rotating machine to be lighter and cost lower.

Second Embodiment

Figure 5:
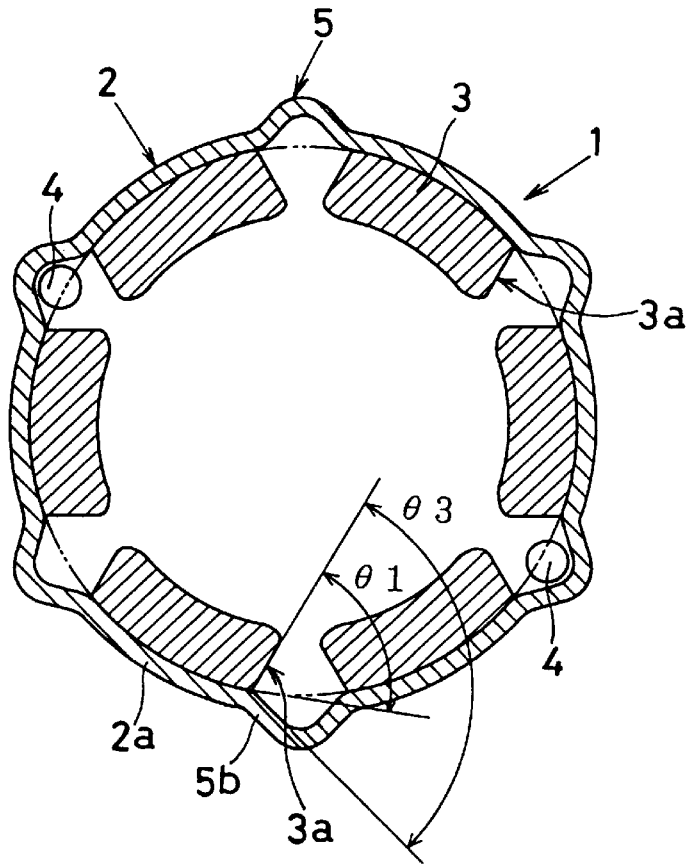
FIG. 5 is a sectional view showing a stator in a radial direction thereof according to a second embodiment of the present invention.

In a second embodiment shown in FIG. 5, the shape of the bulged portion 5 formed between the magnetic poles 3 of the yoke 2 has a triangular shape in section. That is, two radially outwardly extending sides of he bulged portion 5 is approximately linearly connected with the cylindrical wall portion 2a of the yoke 2. In this case, because the angle θ3 formed between the side surface 3a of each magnetic pole 3 and an approximately linear portion 5b of the bulged portion 5 can be allowed to be greater than the angle θ2 (θ3>θ2) shown in the first embodiment, the magnetic leakage from the side surface 3a of each magnetic pole 3 can be reduced to a higher extent. Consequently, a greater effect (improvement of output owing to reduction in magnetic leakage) can be provided.

Third Embodiment

Figure 6:
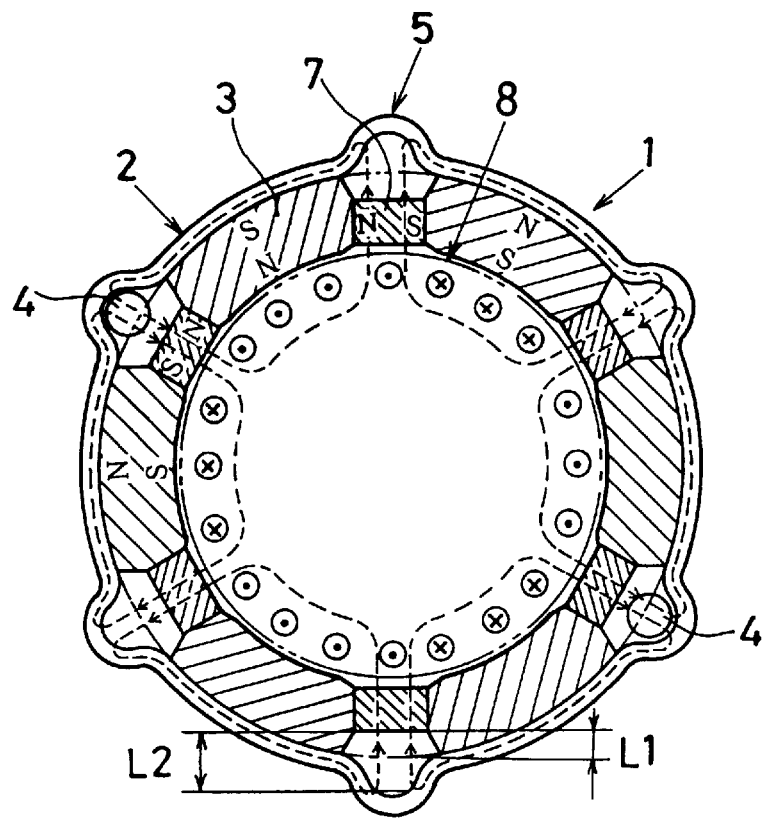
FIG. 6 is a sectional view showing an electric rotating machine in a radial direction thereof according to a third embodiment of the present invention.

In a third embodiment shown in FIG. 6, auxiliary magnetic poles 7 are installed between the magnetic poles 3 arranged circumferentially adjacent to each other. Similarly to the main magnetic poles 3, each auxiliary magnetic pole 7 comprises a permanent magnet such as ferrite and magnetized such that south poles and north poles appear circumferentially. Each auxiliary magnetic pole 7 is so magnetized that it has the same polarity as that of the side surface of the main magnetic pole 3 adjacent thereto.

Figure 7:
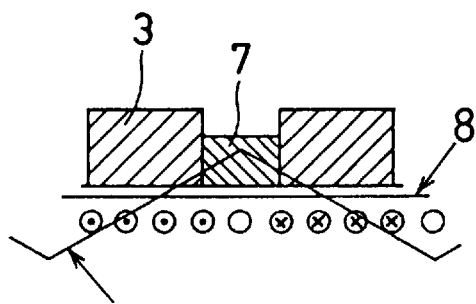
FIG. 7 is a partly developed view, of a rotor, showing the relationship between the magnetomotive force of an armature and an auxiliary magnetic pole in the fifth embodiment.

As shown in FIG. 7, because each auxiliary magnetic pole 7 is positioned at the maximum point of the magnetomotive force of an armature 8 between the main magnetic poles 3, the demagnetizing performance of each auxiliary magnetic pole 7 depends greatly on the magnetic resistance of a magnetic circuit (shown by broken lines in FIG. 6) including the auxiliary magnetic poles 7. That is, as the magnetic resistance of the magnetic circuit increases, the demagnetizing performance of each auxiliary magnetic pole 7 is increasingly improved.

The magnetic resistance R is determined by the following equation (equation 4):

$$R = L/(\mu \cdot A) \qquad \text{<Equation 4>}$$

where L: distance between each auxiliary magnetic pole 7 and inner circumferential surface of yoke 2, A: sectional area of each auxiliary magnetic pole 7, $\mu$: magnetic permeability of air.

The equation 4 indicates that as the distance L between each auxiliary magnetic pole 7 and the inner circumferential surface of the yoke 2 becomes longer, the magnetic resistance R becomes increasingly large.

In the third embodiment, because each auxiliary magnetic pole 7 is installed between the magnetic poles 3 arranged circumferentially adjacent to each other, the distance L between each auxiliary magnetic pole 7 and the inner circumferential surface of the yoke 2 is the distance L2 between the auxiliary magnetic pole 7 and the inner circumferential surface of each bulged portion 5. As shown in FIG. 6, the distance L2 is longer than the distance L1 obtained when the bulged portions 5 are not formed. Consequently, the magnetic resistance is greater than that provided when the bulged portions 5 are not formed, which improves the demagnetizing performance of each auxiliary magnetic pole 7. Thus, leakage magnetic flux between the main magnetic poles 3 is reduced further and hence the output of the electric rotating machine can be improved.

Fourth Embodiment

Figure 8:
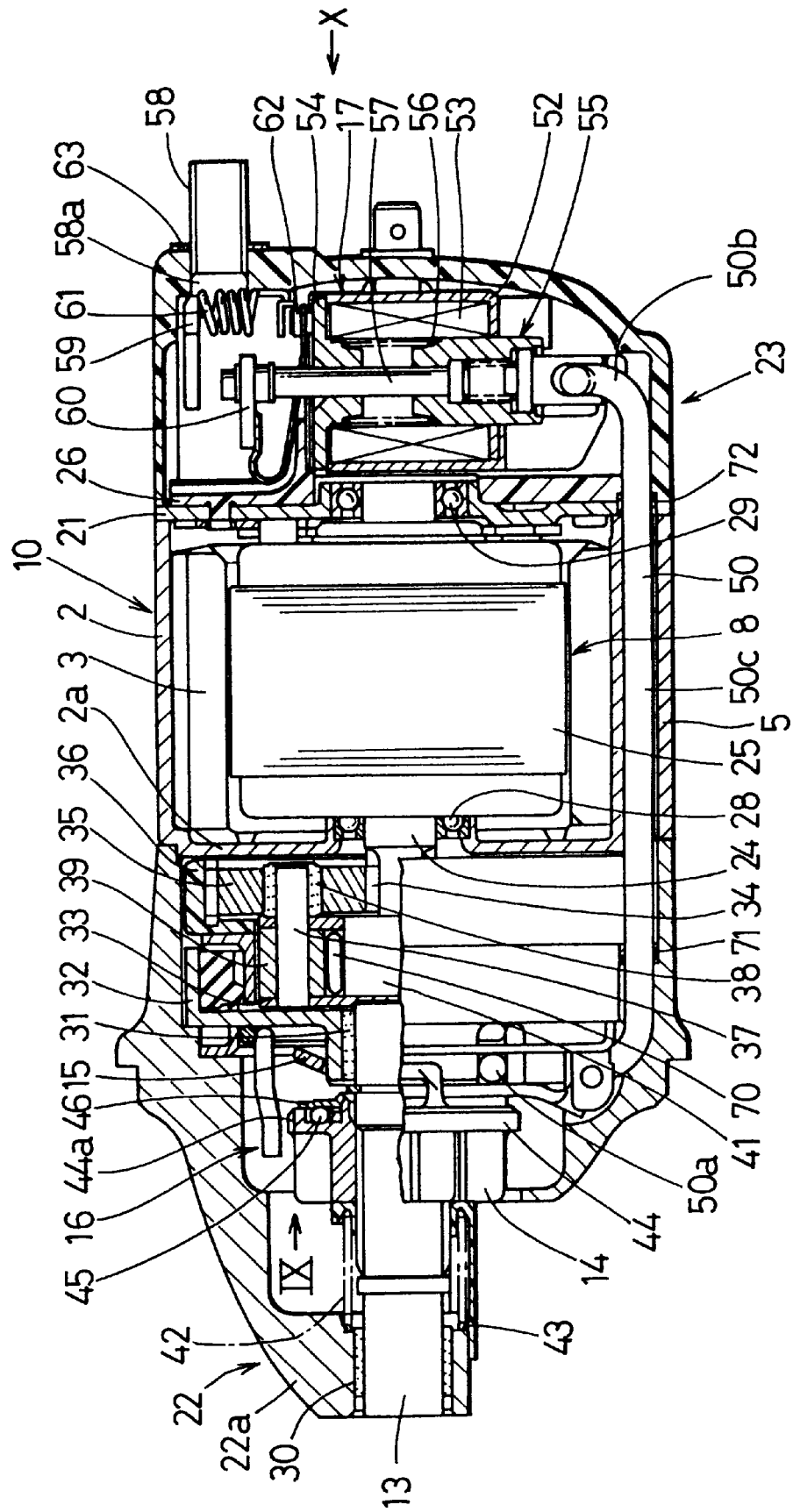
FIG. 8 is an entire sectional view showing a starter using a stator according to a fourth embodiment of the present invention.

In a fourth embodiment shown in FIG. 8, bulged portions 5 are used to accommodate not only through-bolts but also a part of pinion rotation-restricting member. In this embodiment, a starter comprises generally a starter motor 10 for generating a rotational force when it is energized with electric current; an output shaft 13 positioned coaxially with the rotation shaft of the starter motor 10; a rotational force transmission device for transmitting the rotational force of the starter motor 10 to the output shaft 13; a pinion 14 fitted around the outer periphery of the output shaft 13; a rotation-restricting member 16 for restricting the rotation of the pinion 14 when the pinion 14 engages a ring gear (not shown); a retraction-restricting member 15 for restricting the retraction of the pinion 14 after the pinion 14 engages the ring gear; and a magnet switch 17 positioned in the rear of the starter motor 10.

The starter motor 10 comprises a yoke 2; fixed magnetic poles (permanent magnets) 3; an armature 8; and a brush (not shown). The yoke 2 is cylindrical. The yoke 2 and a bearing-holding plate 21 positioned in the rear (right side in the figure) thereof are sandwiched between a housing 22 and an end cover 23.

The armature 8 comprises a rotation shaft 24; an armature core 25 formed on the periphery of the shaft 24; armature coils (not shown) installed on the core 25; and a commutator (not shown) installed on the rear end surface of the core 25. In the armature 8, the shaft 24 is positioned coaxially with the output shaft 13; one side of the shaft 24 is rotatably supported through a bearing 29 installed on a partitioning portion 2a formed on the yoke 2 and partitioning the armature 8 and a planetary gear reduction mechanism from each other; and the other side of the shaft 24 is rotatably supported on the bearing-holding plate 21 through the bearing 29.

The brushes are held by a holder 26 engaging the bearing-holding plate 21 and pressed against the commutator by springs (not shown) installed on the end cover 23.

The front end of the output shaft 13 is rotatably supported by a bearing portion 22a of the housing 22 through a bearing 30. The rear end of the output shaft 13 is rotatably supported by a center case 32 through a bearing 31.

A planet carrier 33 of the planetary gear reduction mechanism is installed on the rear end of the output shaft 13. The center case 32 is fixed to the inner periphery of the rear end of the housing 22, thus covering the periphery of the rotational force transmission means.

The rotational force transmission device includes the planetary gear reduction mechanism. The planetary gear reduction mechanism reduces the rotational speed of the starter motor 10 and increases the output torque thereof. The planetary gear reduction mechanism comprises a sun gear 34 formed on the periphery of the shaft 24 at the front end thereof; three planetary gears 35 engaging the sun gear 34; an internal gear 36 engaging each planetary gear 35; and the planet carrier 33.

The three planetary gears 35 are rotatably supported by a pin 37 fixed to the planet carrier 33 through a bearing 38.

The rotational force transmission device further includes a one-way clutch. The one-way clutch comprises an outer member 39 fixed to the pin 37 fixed to the planet carrier 33; an inner member 41 formed on the output shaft 13; and rollers 70.

The pinion 14 accommodated inside the housing 22 is in engagement with a helical spline formed on the output shaft 13 at a position proximate to the front end thereof and is normally urged toward the rear (right side in the figure) of the output shaft 13 by a spring 42 positioned at the front side of the pinion 14. The spring 42 urges the pinion 14 through a shutter 43 fitted in the periphery of the output shaft 13 at a position in front of the pinion 14. Interlocked with the movement of the pinion 14, the shutter 43 opens and closes a lower side opening (not shown) positioned at the ring gear side of the housing 22.

A flange 44 having a greater outer diameter than that of the pinion 14 and having a large number of concaves 44a formed on the periphery thereof is formed integrally with the pinion 14 at the rear side thereof. The number of the concaves 44a is greater than that of the external teeth of the pinion 14. A thrust ring 46 rotatable in the rotational direction of the pinion 14 is installed on the rear side of the flange 44 through a thrust bearing 45.

Figure 9:
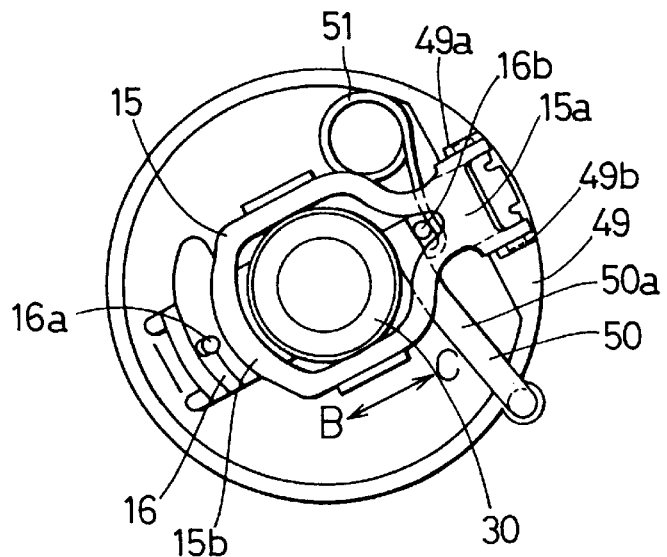
FIG. 9 is a front view showing a retraction-restricting member and rotation-restricting member seen in a direction IX in FIG. 8.

As also shown in FIG. 9, the retraction-restricting member 15 comprises a connection portion 15a engaging a hole (not shown) formed on each of two plate projections 49a and 49b formed on a plate 49; and a contact portion 15b contacting a first projection 16a of the rotation-restricting member 16. The retraction-restricting member 15 swings together with the pinion 14 on the hole, with a part of the periphery of the retraction-restricting member 15 in engagement with two claws (not shown) formed on the thrust ring 46. The plate 49 is sandwiched between the housing 22 and the center case 32.

The rotation-restricting member 16 is formed by winding a rod-shaped metal material. At each end of the rotation-restricting member 16, there are formed the first projection 16a which contacts the contact portion 15b of the retraction-restricting member 15 and a second projection 16b which contacts an operation portion 50a formed on a lever 50. The first projection 16a and the second projection 16b radially opposed to each other are formed by bending perpendicularly upward in the same direction.

The rotation-restricting member 16 is accommodated in a space between the center case 32 and the plate 49. The first projection 16a and the second projection 16b are taken out forward from the plate 49 such that they are movable in a direction B-C in FIG. 9. The rotation-restricting member 16 is normally urged toward the direction B in FIG. 9 by a spring 51 installed on the plate 49. When the attraction force of the magnet switch 17 is transmitted to the second projection 16b through the lever 50, the entire rotation-restricting member 16 moves in the direction C in FIG. 9 against the urging force of the spring 51. When the magnet switch 17 is turned off and the attraction force thereof disappears, the entire rotation-restricting member 16 is moved in the direction B in FIG. 9 by the urging force of the spring 51, thus returning to the initial position.

The magnet switch 17 is held by the bearing-holding plate 21 at its rear side and positioned inside the end cover 23 such that the operation direction of the magnet switch 17 intersects with the shaft 24 of the starter motor 10. The magnet switch 17 comprises a switch cover 52; a coil 53; a fixed iron core 54; a plunger 55; a spring 56; and a rod 57. The switch cover 52 is made of a magnetic material (for example, iron) which is formed in the shape of a cup by press molding. An insertion hole into which the plunger 55 is slidably inserted is formed at the center of the bottom surface (lower surface in FIG. 8) of the switch cover 52.

Figure 10:
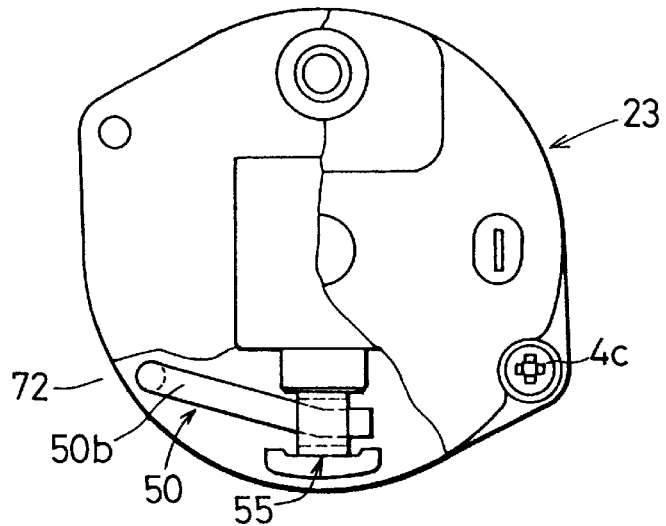
FIG. 10 is a rear view showing an end cover partly in section seen in a direction X in FIG. 8.

The coil 53 is connected with a battery (not shown) through a start switch (ignition switch (not shown)) of a vehicle, thus generating a magnetic force when the start switch is turned on and the coil 53 is energized. The fixed iron core 54 is positioned at the upper side of the coil 53 and fixed to an opening of the switch cover 52. The plunger 55 comprises a magnetic material (for example, iron) and approximately cylindrical. The plunger 55 is positioned in the hollow portion of the coil 53 such that it is opposed to the fixed iron core 54 and attracted toward the magnetized fixed iron core 54 (upward in FIG. 8) when the coil 53 is energized. A moving portion 50b of the lever 50 engages the bottom of the plunger 55 as shown in FIG. 10.

The spring 56 is positioned in the inner periphery of the coil 53 such that it is interposed between the plunger 55 and the fixed iron core 54, thus urging the plunger 55 downward (downward in FIG. 8) relative to the fixed iron core 54. That is, when the coil 53 is deenergized, the spring 56 returns the plunger 55 attracted toward the fixed iron core 54 against the urging force of the spring 56 to the initial position.

The rod 57 is fixed to the upper side of the plunger 55 and passes through the hollow portion of the coil 53 and slidably through a through-hole formed at the center of the fixed iron core 54, thus projecting upward. The magnetic switch 17 is positioned at the side opposite to the pinion-positioned side and approximately perpendicularly to the shaft 24 of the armature 8.

The switch contact of the magnet switch 17 comprises a terminal bolt 58 installed on the end cover 23; a fixed contact 59 fixed to a head 58a of the terminal bolt 58 and connected with an actuation resistor 61; a main movable contact 60 connected with a lead wire (not shown) of a positive side brush; and an auxiliary movable contact 62 connected with the main movable contact 60 via a copper plate.

The terminal bolt 58 is fixed to the end cover 23 by tightening a washer 63, with the front end of the terminal bolt 58 penetrating through a bottom wall 23a of the end cover 23 and projecting from the end cover 23. The terminal bolt 58 is connected with the positive electrode of the battery through a feeder line (not shown). The fixed contact 59 positioned inside the end cover 23 is fixed to the head 58a of the terminal bolt 58 by welding or the like.

The main movable contact 60 is positioned in opposition to the fixed contact 59 and slidably fitted in the rod 57 of the magnet switch 17. One end of the coiled resistor 61 formed of a nickel wire is connected with the fixed contact 59 and other end thereof is positioned in opposition to the auxiliary movable contact 62. The auxiliary movable contact 62 is positioned in opposition to the actuation resistor 61. When the magnet switch 17 is turned on and the plunger 55 is attracted toward the fixed iron core 54, the auxiliary movable contact 62 contacts the actuation resistor 61 which is electrically connected with the terminal bolt 58, with the movement of the rod 57. When the magnet switch 17 is turned off, the auxiliary movable contact 62 contacts the outer end surface of the fixed iron core 54, thus being electrically conductive.

The interval between the auxiliary movable contact 62 and the actuation resistor 61 is set to be smaller than that between the main movable contact 60 and the fixed contact 59. When the magnet switch 17 is turned on and when the plunger 55 is attracted toward the fixed iron core 54, the auxiliary movable contact 62 contacts the resistor 61 electrically connected with the terminal bolt 58 before the main movable contact 60 contacts the fixed contact 59. As a result, the voltage of the battery is applied to the armature 8 of the starter motor 10 through the resistor 61.

Figure 11:
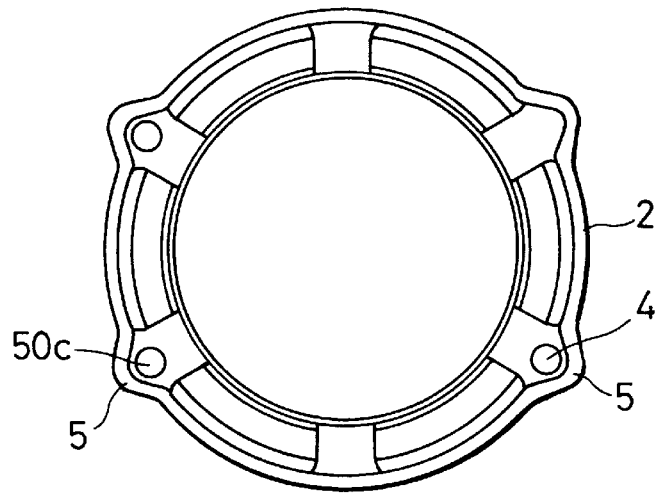
FIG. 11 is a view showing a lever positioned around a yoke in the fourth embodiment.

The lever 50 is formed of a material, for example, iron. The lever 50 engages the plunger 55. The lever 50 comprises the moving portion 50b which moves according to the movement of the plunger 55; the operation portion 50a which is operated in contact with the second projection 16b of the rotation-restricting member 16; and a rod-shaped portion 50c having the shape of a linear rod and connecting the moving portion 50b and the operation portion 50a with each other. As shown in FIG. 11, the rod-shaped portion 50c is positioned rotatably in one of bulged portions 5 of the yoke 2 and extends in substantially parallel with the shaft 24.

The moving portion 50b and the operation portion 50a extend radially outward from each end of the rod-shaped portion 50c, with the axis of the rod-shaped portion 50c serving as the center of the rotation of the moving portion 50b and the operation portion 50a. A predetermined angle, for example, about 60° is formed between the moving portion 50b and the axis of the rod-shaped portion 50c and between the operation portion 50a and the axis of the rod-shaped portion 50c. The axis of the rod-shaped portion 50c is supported by bearings 71 and 72 made of resin. The bearing 71 is interposed between the housing 22 and the center case 30. The bearing 72 is interposed between the end cover 23 and the bearing-holding plate 21.

Figure 12:
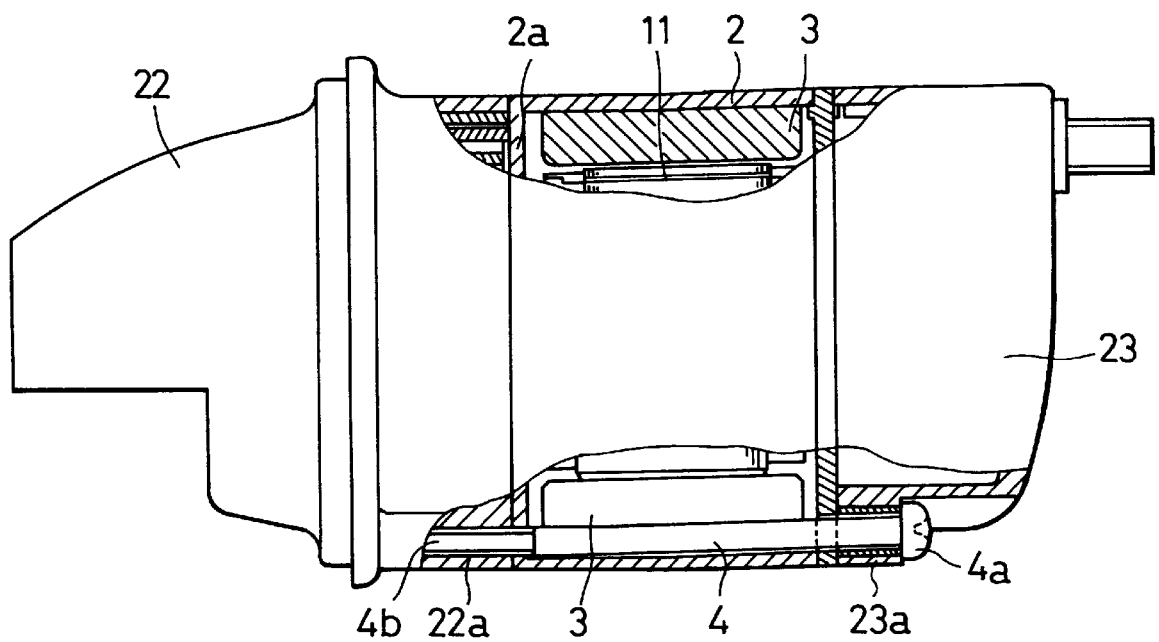
FIG. 12 is a side view showing the starter partly in section according to the fourth embodiment of the invention.

As shown particularly in FIG. 12, a through-bolt 4 is inserted into the end cover 23 having a through-hole 23a with which the head 4a of the through-bolt 4 contacts. A male screw portion 4b formed at an end of the through-bolt 4 is penetrated through the through-hole 23a of the end cover 23 to engage the male screw portion 4b with a female screw portion 22a of the housing 22 so that the end cover 23 and the housing 22 are fixed to the yoke 2 tightly. As shown in FIG. 11, in this embodiment, a pair of the through-bolts 4 are accommodated in the bulged portions 5, of the yoke 2, opposed to each other. The bulged portion 5 of the yoke 2 not accommodating the through-bolt 4 nor the lever 50 provides air passages inside the yoke 2.

The fourth embodiment operates as follows.

When the starter switch (not shown) is turned on by a driver, the coil 53 of the magnet switch 17 is energized, and the plunger 55 is attracted toward the magnetized fixed iron core 54 against the urging force of the spring 56. With the movement of the plunger 55, the moving portion 50b of the lever 50 rotates on the axis of the rod-shaped portion 50c. As a result, the rod-shaped portion 50c supported by the bearings 71 and 72 also rotates, and the operation portion 50a also rotates on the axis of the rod-shaped portion 50c, thus contacting the second projection 16b of the rotation-restricting member 16. As a result, the rotation-restricting member 16 moves in the direction C of FIG. 9 in a predetermined amount, and the first projection 16a engages the concave 44a formed on the periphery of the flange 44, thus restricting the rotation of the pinion 14.

On the other hand, with the upward movement of the plunger 55, the auxiliary movable contact 62 contacts the actuation resistor 61 electrically connected with the terminal bolt 58. As a result, electric current flows through the positive side brush via the actuation resistor 61. Consequently, the starter motor 10 is actuated to rotate the armature 8, with a low voltage being applied thereto. The rotation of the armature 8 is transmitted to the output shaft 13 by reducing the rotation speed of the armature 8 by the planetary gear reduction mechanism. As a result, the output shaft 13 rotates. Because the rotation of the pinion 14 is restricted by the first projection 16a, the rotational force of the output shaft 13 acts as a thrust of pressing the pinion 14 axially. As a result, the pinion 14 moves forward along the helical spline formed on the output shaft 13, thus engaging the ring gear.

Owing to the forward movement of the pinion 14, the retraction-restricting member 15 is pulled by the thrust ring 46, thus swinging together with the pinion 14 on the hole of the two plate projection portions 49a and 49b formed on the plate 49. When the pinion 14 engages the ring gear completely, the front end of the first projection 16a disengages from the concave 44a of the flange 44, thus moving to the rear end of the retraction-restricting member 15 and releasing the pinion 14 from the rotation-restricted state.

When the main movable contact 60 contacts the fixed contact 59, the actuation resistor 61 is short-circuited and a rated voltage is applied to the starter motor 10 to rotate the armature 8. The rotation of the armature 8 is transmitted to the output shaft 13 through the planetary gear reduction mechanism. As a result, the pinion 14 whose rotation has been restricted rotates, together with the output shaft 13, thus rotating the ring gear. Thus, the engine can be started.

In the state in which the pinion 14 moves forward and engages the ring gear, the urging force of the spring ?42 positioned in front of the pinion 14 becomes great. When the pinion 14 is rotated by the ring gear after the engine starts, the rotational force of the engine acts as a force of moving the pinion 14 backward by the action of the helical spline. At this time, the first projection 16a of the rotation-restricting member 16 contacts the contact portion 15a of the retraction-restricting member 15, thus restricting the backward movement of the pinion 14 and restricting the pinion 14 from moving backward.

When the starter switch is turned off and the coil 53 of the magnet switch 17 is deenergized, the magnetic force of the coil 53 disappears. Thus, the plunger 55 attracted toward the fixed iron core 54 is returned to the initial position (moves downward in FIG. 1) by the urging force of the spring 56. As a result, the force of pressing the plunger downward through the lever 50 as a result of the contact between the retraction-restricting member 15 and the second projection 16b of the rotation-restricting member 16 disappears. Thus, the rotation-restricting member 16 is returned to the initial position by the spring force of the return spring 51.

At this time, the first projection 16a of the rotation-restricting member 16 disengages from the contact portion 15b of the retraction-restricting member 15. Thus, the engaging state is released and the operation portion 50a of the lever 50 disengages from the second projection 16b of the rotation-restricting member 16. Thus, the contact between the lever 50 and the rotation-restricting member 16 is released. Consequently, subjected to the retraction force by the ring gear, the pinion 14 is returned to the stationary position.

The present invention should not be limited to the above embodiments but various modification and changes may be made to the embodiments without departing from the spirit of the invention.

I claim:

1. An electric rotating machine comprising:

a cylindrical yoke;

an armature disposed rotatably in the yoke; and a plurality of magnetic poles made of permanent magnets and circumferentially arranged on an inner circumferential surface of the cylindrical yoke at substantially regular intervals, wherein the yoke has bulged portions extending axially between two of the magnetic poles which are circumferentially adjacent to each other, each of the bulged portions extends from a starting point located proximately to an intersection of the inner circumferential surface of the yoke and a side surface of each of the magnetic poles in a direction from an inner circumferential side of the yoke toward an outer circumferential side thereof.

2. The electric rotating machine according to claim 1, wherein an angle formed between the side surface of each of the magnetic poles and the inner circumferential surface of each of the bulged portions extending from the starting point toward the outer circumferential side of the yoke is greater than an angle formed between the side surface of each of the magnetic poles and a tangent crossing on the inner circumferential surface of the yoke at the intersection point of the side surface of each of the magnetic poles and the inner circumferential surface of the yoke.

3. The electric rotating machine according to claim 1, wherein an auxiliary magnetic pole is interposed between the magnetic poles arranged circumferentially adjacent to each other.

4. The electric rotating machine according to claim 1, further comprising:

a closing member for closing an open end of the yoke positioned at at least one end thereof in the axial direction thereof; and through-bolts fixing the closing member to the yoke, the through-bolts being provided radially inside of the inner circumferential sides of the bulged portions.

5. The electric rotating machine according to claim 1, wherein the bulged portions are provided in at least two pairs, and the bulged portions in each pair opposes to each other in a radial direction.

6. The electric rotating machine according to claim 1, further comprising:

a magnetic switch disposed at one axial side of the armature;

a pinion disposed at another axial side of the armature for engagement with an engine when driven by the armature; and a connecting member disposed between the magnetic switch and the pinion and extending radially inside of the yoke, the connecting member being disposed radially inside of the one of the bulged portions.

7. The electric rotating machine according to claim 1, wherein at least one of the bulged portions is used as an air passage in the yoke.

* * * * *